US010331931B2

(12) United States Patent
Aldor-Noiman et al.

(10) Patent No.: US 10,331,931 B2
(45) Date of Patent: Jun. 25, 2019

(54) MODELING TRENDS IN CROP YIELDS

(71) Applicant: THE CLIMATE CORPORATION, San Francisco, CA (US)

(72) Inventors: Sivan Aldor-Noiman, Foster City, CA (US); Erik Andrejko, Oakland, CA (US)

(73) Assignee: The Climate Corporation, San Francisco, CA (US)

( * ) Notice: Subject to any disclaimer, the term of this patent is extended or adjusted under 35 U.S.C. 154(b) by 388 days.

(21) Appl. No.: 15/017,370

(22) Filed: Feb. 5, 2016

(65) Prior Publication Data

US 2017/0228475 A1 Aug. 10, 2017

(51) Int. Cl.
*G06K 9/00* (2006.01)
*G06Q 10/06* (2012.01)

(52) U.S. Cl.
CPC .............. *G06K 9/00* (2013.01); *G06Q 10/06* (2013.01); *G06F 2217/16* (2013.01)

(58) Field of Classification Search
CPC ....... G06K 9/00; G06Q 10/06; G06F 2217/16
USPC ............................................................ 703/2
See application file for complete search history.

(56) References Cited

U.S. PATENT DOCUMENTS

| | | | |
|---|---|---|---|
| 2005/0234691 A1* | 10/2005 | Singh | G06Q 10/04 703/11 |
| 2006/0287896 A1 | 12/2006 | McComb et al. | |
| 2011/0071826 A1* | 3/2011 | Ma | G06F 17/30681 704/235 |

OTHER PUBLICATIONS

Hollinger_2011 (Crop Condition and Yield Prediction at the Field Sacle With Geospactial and Artificial Neural Network Applications, Aug. 2011).*
Data_Mining_2004 (Chapter 2 Data Mining Process, 2004).*
International Searching Authority, "Search Report" in application No. PCT/US17/16007, dated Apr. 25, 2017, 12 pages.
Current Claims in application No. PCT/US17/16007, dated Apr. 2017, 5 pages.
Robert Finger. Investigating the performance of different estimation tech- niques for crop yield data analysis in crop insurance applications. Agri- cultural Economics, 2013, 14 pages.
Baker, Kirk, "Singular Value Decomposition Tutorial", dated Mar. 29, 2005, 24 pages.

(Continued)

*Primary Examiner* — Brian S Cook
(74) *Attorney, Agent, or Firm* — Hickman Palermo Becker Bingham LLP; Malgorzata A. Kulczycka

(57) ABSTRACT

A method and system for modeling trends in crop yields is provided. In an embodiment, the method comprises receiving, over a computer network, electronic digital data comprising yield data representing crop yields harvested from a plurality of agricultural fields and at a plurality of time points; in response to receiving input specifying a request to generate one or more particular yield data: determining one or more factors that impact yields of crops that were harvested from the plurality of agricultural fields; decomposing the yield data into decomposed yield data that identifies one or more data dependencies according to the one or more factors; generating, based on the decomposed yield data, the one or more particular yield data; generating forecasted yield data or reconstructing the yield data by incorporating the one or more particular yield data into the yield data.

18 Claims, 9 Drawing Sheets

(56) References Cited

OTHER PUBLICATIONS

CAR Models, "Regression and smoothing > Spatial series and spatial autoregression > CAR models", last viewed on Mar. 14, 2015, 6 pages.

Conradt et al., "Yield trend estimation in the presence of non-constant technological change and weather effects", dated Feb. 2012, 16 pages.

Cross Validated, Spatial statistics models CAR vs SAR, http://stats.stackexchange.com/questions/277/spatial-statistics-models-car-vs-sar, last viewed on Apr. 14, 2016, 1 page.

Haipeng Shen and Jianhua Z. Huang. Interday forecasting and intraday updating of call center arrivals. MSOM, 10(3):391-410, Jun. 2008, 37 pages.

A. Forrest Troyer. Adaptedness and heterosis in corn and mule hybrids. Crop Science, 46(2):528, 2006, 16 pages.

Michael A. Tannura. Weather, corn, and soybean yields, and technology in the U.S corn belt. Master's thesis, University of Illinois at Urbana- Champaign, 2007, 239 pages.

WolframMathWorld, "Singular Value Decomposition", http://mathworld.wolfram.com/SingularValueDecomposition.html, last viewed on Apr. 14, 2016, 2 pages.

Robert Finger. Revisiting the evaluation of robust regression techniques for crop yield data detrending. Am. J. Agr. Econ., 92(1):205-211, Jan. 2010, 17 pages.

Scott M. Swinton and Robert P. King. Evaluating robust regression tech- niques for detrending crop yield data with nonnormal errors. American Journal of Agricultural Economics, dated May 1991, 7 pages.

Seung-Ryong Yang, Won W. Koo, and William W. Wilson. Heteroskedasticity in crop yield models. Journal of Agricultural and Resource Economist, 17(01), 1992, 7 pages.

Singular Value Decomposition (SVD) tutorial, http://web.mit.edu/be.400/www/SVD/Singular_Value_Decomposition.htm, last viewed on Apr. 14, 2016, 3 pages.

Singular Value Decomposition, OCW Scholar, http:ocw.mit.edu/courses/mathematics/18-06sc-linear-algebra-fall-2011/positive-definite-matrices-and-applications/singular-value-decomposition, Apr. 2016, 2pgs.

Wikipedia, "Singular value decomposition", https://en.wikipedia.org/wiki/Singular_value_decomposition, last viewed on Apr. 14, 2016, 12 pages.

IRI, Statistics Tutorial, "Singular Value Decomposition", http://iridl.Ideo.columbia.edu/dochelp/StatTutorial/SVD/index.html, last viewed on Apr. 14, 2016, 15 pages.

\* cited by examiner

200 Mobile Computer Application

| 208 Seeds and Planting Instructions | 210 Nitrogen Instructions | 212 Weather Instructions | 214 Field Health Instructions | 216 Performance Instructions |

206 Digital Map Book

204 Overview and Alert Instructions

202 Account, Fields, Data Ingestion, Sharing Instructions

(b)

220 Cab Computer Application

| 222 Maps - Cab | 224 Remote View | 226 Data Collect and Transfer | 228 Machine Alerts | 230 Script Transfer |

232 Scouting - Cab

MODELING TRENDS IN CROP YIELDS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015 The Climate Corporation.

FIELD OF THE DISCLOSURE

The present disclosure generally relates to computer systems useful in agriculture. The disclosure relates more specifically to computer systems that are programmed or configured to model trends in yield of crops harvested from agricultural fields.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data measurements representing yields of crops harvested from agricultural fields are usually collected via a measurement process. The measurement process typically is a stochastic process that is prone to errors and generalizations. For example, the received data measurements may be incomplete or inaccurate. Errors may be introduced at all levels and the errors may often be unavoidable. For example, even if reports on yields of crops are generated based on reports obtained using a sophisticated survey process at the county level, the reports may still be missing critical data.

The survey process also may be inaccurate and may fail to take into consideration the fact that measurements of yields of crops harvested from one agricultural field may depend on crops harvested from the neighboring fields. Furthermore, the measurements may not reflect the fact that the crops harvested from one field may be influenced by the local microclimate and irrigation practices specific to that field, but not to other fields.

SUMMARY OF THE DISCLOSURE

The appended claims may serve as a summary of the disclosure.

BRIEF DESCRIPTION OF DRAWINGS

FIG. 2 illustrates two views of an example logical organization of sets of instructions in main memory when an example mobile application is loaded for execution.

DETAILED DESCRIPTION

Embodiments are disclosed in sections according to the following outline:
1. GENERAL OVERVIEW
2. EXAMPLE AGRICULTURAL INTELLIGENCE COMPUTER SYSTEM
    2.1. STRUCTURAL OVERVIEW
    2.2. APPLICATION PROGRAM OVERVIEW
    2.3. DATA INGEST TO THE COMPUTER SYSTEM
    2.4. PROCESS OVERVIEW—AGRONOMIC MODEL TRAINING
    2.5 IMPLEMENTATION EXAMPLE—HARDWARE OVERVIEW
3. CHARACTERISTICS OF MEASUREMENTS OF YIELDS OF CROPS
4. MODELING TRENDS IN YIELDS OF CROPS
    4.1. MODELS FOR REPRESENTING YIELDS OF CROPS
    4.2 LINEAR MODEL
5. SINGULAR VALUE DECOMPOSITION
6. FORECASTING AND RECONSTRUCTING MEASUREMENTS OF YIELDS OF CROPS
7. MODIFIED CONDITIONAL AUTOREGRESSIVE APPROACH
8. EXAMPLE OF COMBINED APPROACHES
9. EXAMPLE RESULT ANALYSIS
10. ADDITIONAL APPROACHES
    10.1. MEAN MODEL APPROACH
    10.2. LINEAR MODEL APPROACH
    10.3. ROBUST LINEAR MODEL APPROACH
    10.4. SMOOTHING SPLINES APPROACH
    10.5. QUADRATIC MODEL APPROACH
    10.6. LOCALLY WEIGHTED REGRESSION APPROACH
    10.7. INTEGRATED MOVING AVERAGE APPROACH
    10.8. RANDOM WALKS
    10.9. MULTIVARIATE ADAPTIVE REGRESSION SPLINES MODEL
11. BENEFITS OF CERTAIN EMBODIMENTS
    1. General Overview Aspects of the disclosure generally relate to computer-implemented techniques for determining characteristics of statistical data representing crop yield data. The crop yield data usually includes data provided by agricultural statistics services. The data may be incomplete and for a variety of reasons may fail to capture characteristics determined based on weather conditions, or soil cultivation techniques. For example, the data may not reflect interrelations in crop yield measurements collected from neighboring fields, collected from the neighboring fields but at different weather conditions.

In an embodiment, a computer-implemented method allows determining the data that is missing in crop yield reports and/or correcting data in the reports that was inaccurate. The method takes into consideration various factors that influence crop yield measurements. For example, the approach allows taking into consideration any of inter-year yield variability, local weather conditions, or interrelations between the yields measured in adjacent fields.

The factors and the yield data may be represented using statistical models. The models of crop yields may be verified against information about weather conditions, soil cultivation practices and harvest-specific anomalies.

Once one or more models are derived, the measurement data that is suspected of errors may be removed from the measurements dataset or corrected in the dataset. Removing or correcting some of the measurements helps reduce the impact on the yield measurements of factors such as weather.

2.2. Example Agricultural Intelligence Computer System
2.1. Structural Overview

Figure 1:
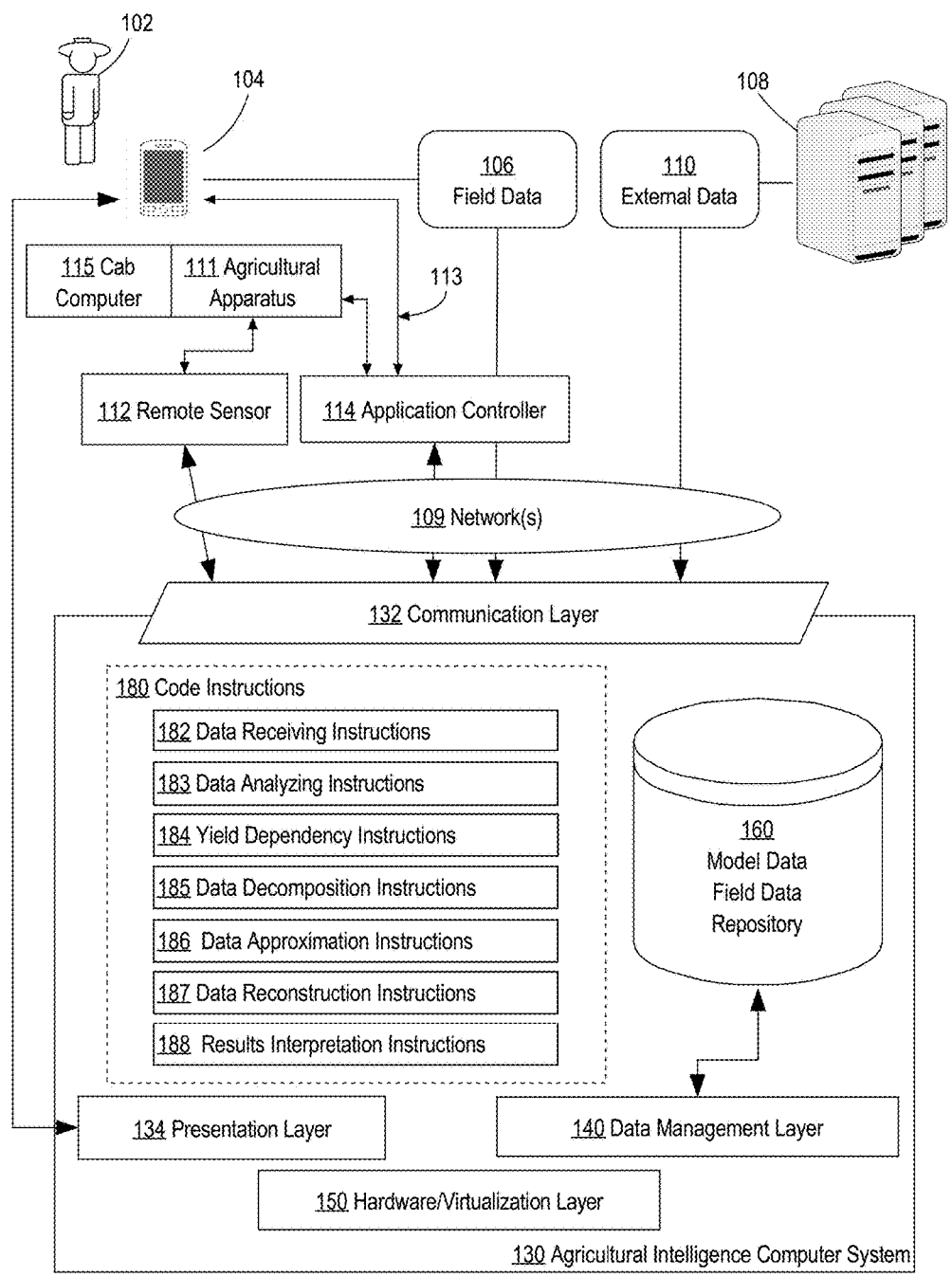
FIG. 1 illustrates an example computer system that is configured to perform the functions described herein, shown in a field environment with other apparatus with which the system may interoperate.

FIG. 1 illustrates an example computer system that is configured to perform the functions described herein, shown in a field environment with other apparatus with which the system may interoperate. In one embodiment, a user 102 owns, operates, or possesses a field manager computing device 104 in a field location or associated with a field location such as a field intended for agricultural activities or a management location for one or more agricultural fields. The field manager computing device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source), (f) pesticide data (for example, pesticide, herbicide, fungicide, other substance or mixture of substances intended for use as a plant regulator, defoliant, or desiccant), (g) irrigation data (for example, application date, amount, source), (h) weather data (for example, precipitation, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

An external data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of that might otherwise be obtained from third party sources, such as weather data.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is an example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

In an embodiment, agricultural intelligence computer system 130 is programmed with or comprises code instructions 180. Code instructions 180 may include one or more set of programming code instructions. For example, code instructions 180 may include data receiving instructions 182 which, when executed by one or more processors, cause the processors to perform receiving, over a computer network, electronic digital data comprising first yield data representing crop yields harvested from an agricultural field. Code instructions 180 may also include pass identification instructions 187 which, when executed, cause identifying a plurality of pass identifiers and a plurality of global positioning system times in the first yield data; filter outlier detection instructions 183 which, when executed by the processors, cause applying one or more filters to the first yield data to identify, from the first yield data, first outlier data. Furthermore, code instructions 180 may include first stage filtering instructions 184 which, when executed by the processors, cause generating first filtered data from the first yield data by removing the first outlier data from the first yield data; spatial outlier detection instructions 185 which, when executed, cause identifying, in the first filtered data, second outlier data representing outlier values based on one or more outlier characteristics; second stage filtering instructions 186 which, when executed, cause generating second outlier data from the first filtered data by removing the second outlier data from the first filtered data; and any other detection instructions 188.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user 102 may be prompted via one or more user interfaces on the user device (served by the agricultural intelligence computer system) to input such information. In an example embodiment, the user 102 may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user 102 may specify identification data by accessing field identification data (provided as shape files or in a similar format) from the U. S. Department of Agriculture Farm Service Agency or other source via the user device and providing such field identification data to the agricultural intelligence computer system.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
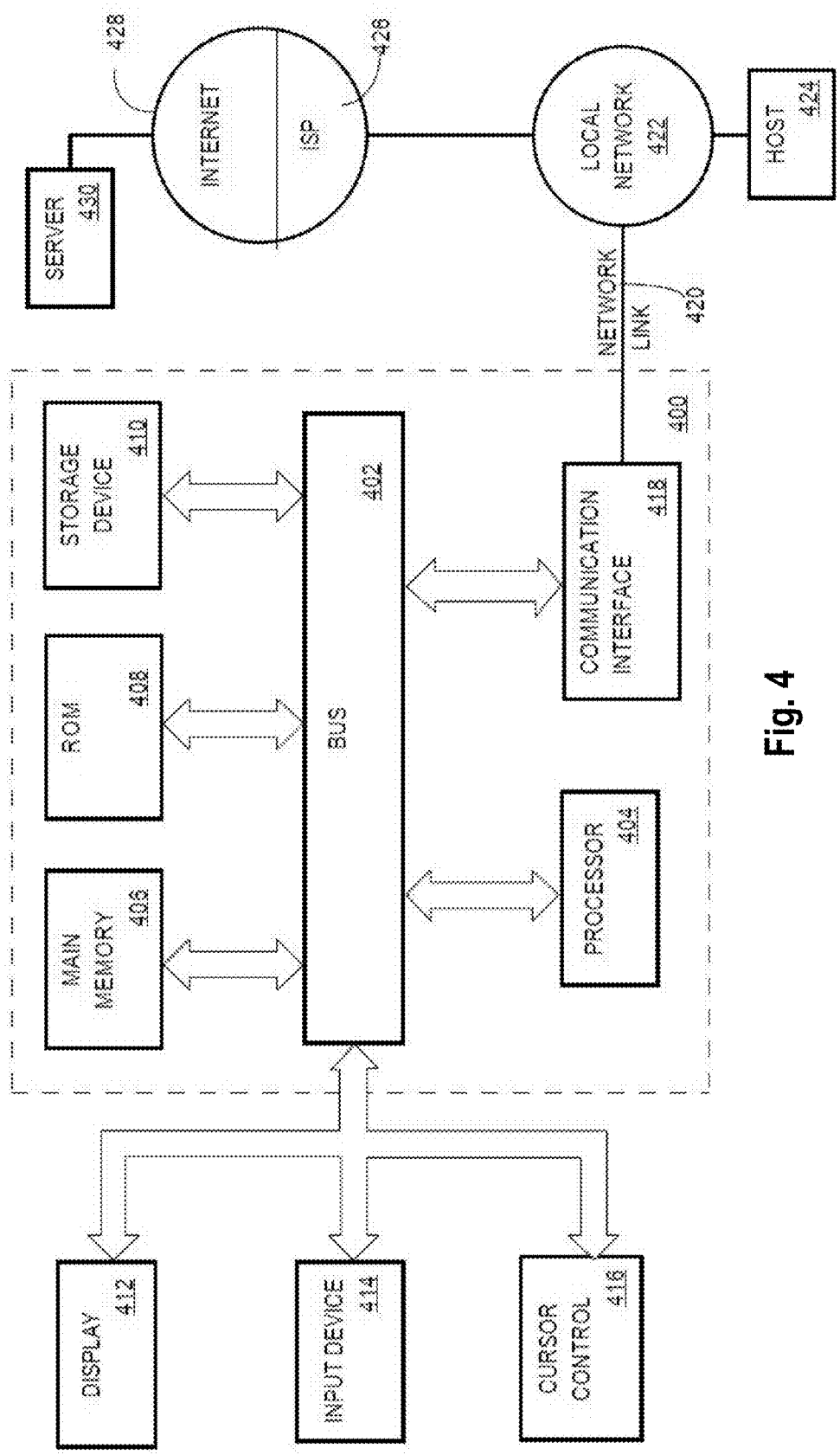
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system 130 independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network 109 to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprising account-fields-data ingestion-sharing instructions 202 are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, external APIs that push data to the mobile application, or instructions that call APIs of external systems to pull data into the mobile application.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 and programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, nitrogen instructions 210 are programmed to provide tools to inform nitrogen decisions by visualizing the availability of nitrogen to crops and to create variable rate (VR) fertility scripts. This enables growers to maximize yield or return on investment through optimized nitrogen application during the season. Example programmed functions include displaying images such as SSURGO images to enable drawing of application zones; upload of existing grower-defined zones; providing an application graph to enable tuning nitrogen applications across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of manure application that were used. Nitrogen instructions 210 also may be programmed to generate and cause displaying a nitrogen graph, once a program is applied to a field, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the NITROGEN ADVISOR, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and U.S. Pat. Pub. 2015/0094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, fertilizer sprayers, or irrigation systems, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

2.4. Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
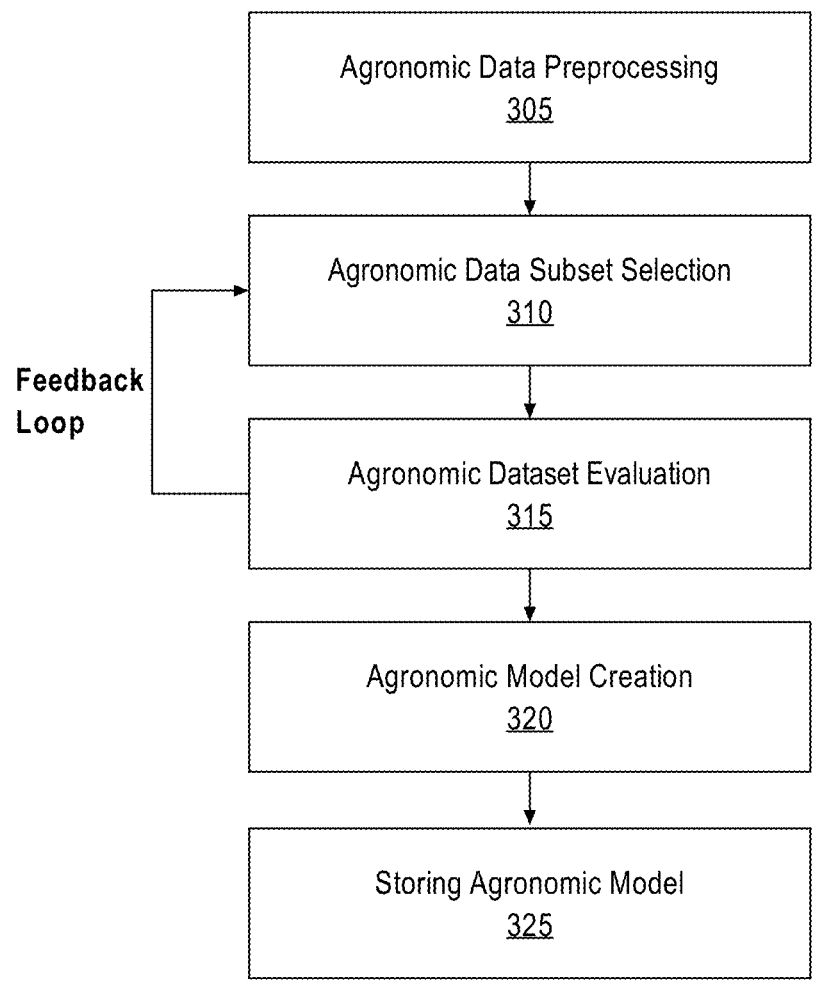
FIG. 3 illustrates a programmed process by which the agricultural intelligence computer system generates one or more preconfigured agronomic models using agronomic data provided by one or more external data sources.

FIG. 3 illustrates a programmed process by which the agricultural intelligence computer system generates one or more preconfigured agronomic models using field data provided by one or more external data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more external data resources. The field data received from one or more external data resources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs. Various embodiments of these techniques include, but are not limited to, those described herein.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Characteristics of Measurements of Yields of Crops

In an embodiment, yield measurements of crops harvested from agricultural fields depend on characteristics of the fields from which the crops are harvested. These characteristics may depend on the type of soil in the fields, the effectiveness of soil cultivation, the effectiveness of soil fertilization, or the quality of seeds used to produce the crops.

Values associated with some of the characteristics may increase over time, especially if the process of fertilizing of the soil improves, or better nutrients are provided to the soil, or better seeds are used to produce the crops. These characteristics may be modeled as constant variables in a mathematical model that represents yield measurements. The representations of these characteristics may be removed from the equations used to approximate or predict yield values that are missing in the received yield measurements.

Other characteristics may be stochastic and may depend, for example, on weather conditions. Since weather conditions are not perfectly predictable, a model to represent yield measurements and stochastic characteristics may use variables that are associated with values that may change frequently. These variables are not removed from model equations, as weather-dependent characteristics may significantly influence the process of approximating or predicting crop yield values.

4. Modeling Trends in Crop Yields

In an embodiment, a computer-implemented approach takes into consideration data values that have been provided as measurements or observations. The measurements may be collected from agricultural fields during activities such as crop harvesting. For example, the measurements may include data values representing yields of crops harvested by one or more combine harvesters from one or more agricultural fields and at two or more time points.

The modeling of the data trends may include forecasting data values representing future crop yields. The forecasting may be performed based on factors such as yield variability, local weather conditions, or interrelations between the crop yields measured in adjacent fields. The approach may also include reconstructing values for the missing data, and correcting inaccurate data. Trend reports may be generated based on the corrected measurements.

4.1. Models for Representing Yields of Crops

A process of forecasting and/or reconstructing yield data may be termed detrending the measurements, or detrending a yield data model. A detrending model can be interpreted as a model in which the crop yield measurements have been modified by taking into consideration local weather conditions or soil characteristics.

Models of crop yield data may be verified against information about local weather conditions, yield measurements, and other inputs that in some manner contribute to anomalies occurring in the crop yields. The additional information, including the weather-based-inputs, may be used in a process of detrending the yield anomaly in the models. The resulting models may be subjected to a comparative assessment of several different detrending methods and comparison charts of the different detrending approaches may be generated.

4.2. Linear Model

A linear detrending model may be generated based on the reported yield values for crops collected from one or more regions and collected during two or more time periods or at two or more time points. Since the relation between the yields collected from the regions and over the years is usually linear, the most applicable models are the models that use linear formulas.

In an embodiment, linear model M derived for observations of yields $y_{i,t}$ observed in a county or other region i in a year t may be computed using the following formula:

$$y_{i,t} = M(i,t) + \epsilon_{i,t} \quad (1)$$

where $\epsilon_{(i,t)}$ is an error value computed for a county or other region i and a year t.

The prediction error term $\epsilon_{(i,t)}$ may be a function of a region-based-parameter and/or a time-based-parameter. The prediction error $\epsilon$ may be interpreted as a yield anomaly. For example, the prediction error $\epsilon_{(i,t)}$ may be interpreted as a yield anomaly that occurred in the i-th region and the t-th year.

In an embodiment, performance of a model M(i, t) may be measured by fitting the model M(i, t) with observations $y_{i,t}$ for $t \in [a, b]$ and evaluating an absolute error $|\epsilon|$ for predictions $y_{i, b+1}$ in the year following the training period. The [a, b] is a range of years. For example, a one-year-ahead prediction may be computed using the observations over a range of years and any of the mean absolute error (MAE) approaches known in statistics.

Model performance may be evaluated using a function computed for the observations $y_{i,t}$ for $t \in [a, b]$ representing a range of years during which the model was trained. Once the model M(i, t) is trained on one or more sets of training data, the model M(i, t) may be used to verify an accuracy and/or completeness of observations $y_{i,t}$ for $t \in [a, b]$, where [a, b] is a range of years.

Various classes of models have been applied to determine approximate values in a crop yield data set. Examples of the applied models are the models that assume either normally distributed errors or non-normal errors. Examples of several models are described below.

In an embodiment, a class of models M(i, t) may be represented using the following equation:

$$y_{i,t} = \alpha_i t + \beta_i + \epsilon_{i,t} \quad (2)$$

where $y_{i,t}$ corresponds to crop yield measurements for the crops harvested from an i-th field and a t-th time point; $\alpha_i$ corresponds to a linear model variable that depends at least on a time parameter; $\beta_i$ corresponds to a vertical offset value for the linear model; and $\epsilon_{i,t}$ corresponds to an error term.

In the class of linear models $y_{i,t}$, the term $\alpha_i$ represents a time-dependent-coefficient determined for the i-th county, whereas $\beta_i$ represents a time-independent-coefficient for the i-th county. The terms $\alpha_i$ and $\beta_i$ may be identical ($\alpha_i = \alpha$ for all i, and $\beta_i = \beta$ for all i). The class of linear models $y_{i,t}$ may have some additional statistical structures reflecting the dependence of the coefficient on the time-parameters and/or the county-parameter. The models $y_{i,t}$ may be used to verify an accuracy and/or completeness of observations $y_{i,t}$ for $t \in [a, b]$, where [a, b] is a range of years, and if needed to determine missing observations and/or to correct the observations that originally contained errors.

The linear function $y_{i,t}$, representing crop yield measurements, may be graphically represented using a two dimensional graph.

5. Singular Value Decomposition

A singular value decomposition (SVD) approach is typically used to reduce an input dataset. More specifically, SVD is usually used to reduce an input dataset containing a large number of values to an output dataset containing significantly fewer values which, however, at least partially capture the variability of the values in the input dataset. Obtaining the output dataset with significantly fewer values than in the input dataset allows conserving computational and storage resources while maintaining the data that captures a large fraction of the variability that is present in the original data.

SVD is particularly useful in the analysis of data representing yield of crops harvested from agricultural fields. Crop yield data in the agricultural and farming sciences often include very large datasets, and processing the very large datasets usually puts significant demands on computational and storage resources of computational systems. However, if the yield datasets are decomposed to smaller datasets of values which exhibit large spatial correlations, the decomposed small dataset may be used to approximate the crop yield datasets to some degree.

In an embodiment, SVD analysis may result in a relatively compact representation of the correlations exhibited by the data in the crop yield datasets, especially if the datasets are multivariate datasets. Furthermore, SVD analysis may provide insight into spatial and temporal variations exhibited in the analyzed crop yield data.

A set of data analyzed using SVD may exhibit anomalies and/or errors, but may also capture spatial dependencies between the data items and/or at least some of the subset of the data items. Examples of spatial dependencies may include spatial relationships between the fields and sub-fields for which the subset of the data is collected, spatial relationships between time components in the data subsets, and the like.

The set of data analyzed using SVD may be used to de-trend the raw yield measurements. Since the purpose of SVD is to find spatial correlations independent of trends, the measurement data may be de-trended by performing SVD analysis. For example, a very large data set of yields of crop measurements may be first decomposed into decomposed datasets, then the decomposed datasets may be used to generate a reconstructed dataset, and the reconstructed dataset may be used to represent the de-trended data.

In an embodiment, SVD analysis is applied to determine and analyze spatial and temporal relations in the yield of crops collected from agricultural fields. SVD analysis may be applied to a set of observations representing crop yield data having associated information about the locations from which the crops were harvested and having associated information about the times at which the crops were harvested. For example, the crop yield data may represent crops harvested from a plurality of locations and at a plurality of time points.

In an embodiment, crop yield data may be represented using a two-dimensional matrix capturing crop yield observations recorded at a plurality of time points and from a plurality of agricultural fields. The fields are often referred to as locations, and each of the plurality of locations may be identified in the matrix by a location identifier, or the like. The plurality of time points may be used to determine a temporal resolution with which the crops were harvested. A temporal resolution may depend on various factors, such as a total time during which the measurements were collected, characteristics of the crop yield measuring sensors and devices, precision and calibration of the sensors and devices, and the like.

SVD approach may be used to forecast future time yield data and/or to reconstruct the yield data received from reporting agencies. The received yield data may be decomposed, and the decomposed data may be used to generate forecasted future time yield data or reconstruct past or present time yield data. For example, a particular future time yield data item may be computed from the decomposed yield data, and incorporated into the yield data set.

In an embodiment, one or more decomposed yield data items may be generated using regional yield trend data that is specific to one or more fields of the plurality of agricultural fields and national yield trend data. The one or more decomposed yield data items may also be generated using one or more weather variability components and one or more weather patterns that are specific to the plurality of agricultural fields.

One or more decomposed yield data items may be used to generate one or more particular yield data items. The one or more particular yield data items may be used to generate forecasted yield data and/or to reconstruct data in a matrix containing yield data representing the yields of crops harvested from agricultural fields. Forecasting or reconstructing yield data may be performed by incorporating the one or more particular yield data into the yield data.

One or more particular yield data may also be used to modify one or more original yield data items that have been determined to be inaccurate. For example, the one or more particular yield data may be used to replace the respective inaccurate original yield data items in a matrix representing the crop measurements.

Decomposed yield data and reconstructed yield data may be used to interpret spatial and temporal dependencies between the yields of the crops that were harvested from the plurality of agricultural fields and to determine how weather conditions and region adjacencies influence the yields. For example, the decomposed yield data and the reconstructed yield data may indicate that the yields of crops harvested from the neighboring fields and approximately within the same month of the year are expected to be similar, while the yields of corps harvested from remote fields and at the time intervals that are far apart from each other are expected to be dissimilar.

In an embodiment, yield data received in a set of measurements representing yields of crops harvested from agricultural fields may be used to generate a model of the yield data. The model may be modified, reconstructed, or otherwise augmented. The model may be implemented as any type of data model. Examples of the models include a mean value model, a linear model, a robust linear model, a smooth spline model, a quadratic model, a locally weighted regression model, an integrated moving average model, a random walk model, a multivariate adaptive regression splines model, any type of SVD model, a conditional autoregressive (CAR) model, and the like.

SVD approach may be applied to a two-dimensional matrix capturing crop yield observations. Assuming the closest rank-p approximation, a two-dimensional matrix X may be expressed as a product of three matrices: an orthogonal matrix U, a diagonal matrix S, and a transpose of an orthogonal matrix V. Hence, a crop yield data set X may be decomposed into $USV^t$ and expressed as:

$$X = USV^t \qquad (3)$$
$$= \sum_{k=1}^{P} s_k u_k v_k^t$$

Figure 6:
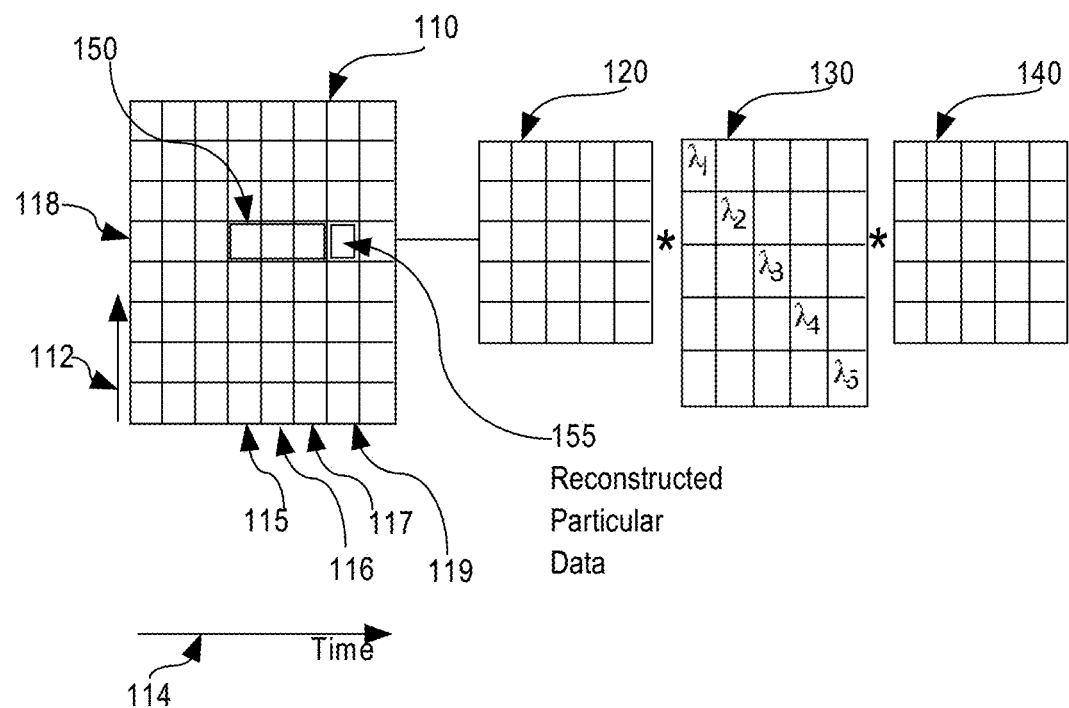
FIG. 6 depicts a block diagram that depicts an example of a singular value decomposition approach for decomposing a large set of crop yield values into smaller subsets that approximate the large set of crop yield values.

FIG. 6 depicts a block diagram that depicts an example SVD approach for decomposing a large set of crop yield values into smaller subsets that approximate the large set of crop yield values. In an embodiment, a large set of crop yield values representing crop yields harvested from a plurality of locations l=1, . . . , and harvested at times t=1, . . . , may be stored in a two dimensional table 110.

In table 110, rows may correspond to locations l of agricultural fields, while columns may correspond to time points t at which the measurements were collected. In the example depicted in FIG. 6, table 110 is indexed using a time horizontal axis 114 and a location vertical axis 118. Horizontal axis 114 may correspond to a time axis, while vertical axis 118 may correspond to a location axis. A data value stored in table 110 at the intersection of a particular row and a particular column corresponds to raw yield measurement data representing crop yield collected from a particular field identified by a location identifier $l_r$ and a time point identifier $t_s$. In the example depicted in FIG. 6, three crop yield values 150 may correspond to crop yield values collected from location 118 at three consecutive time points 115, 116, 117.

Generating SVD decomposition may start with determining a rank approximation constant, which may depend on a vertical dimension of the table X 110. In particular, a closest rank-p approximation may be determined. The table X110 may be decomposed and expressed as a product of three matrices: an orthogonal matrix U, a diagonal matrix S, and a transpose of an orthogonal matrix V. Hence, the crop yield data set X may be decomposed into $USV^t$ and expressed as:

$$\sum_{k=1}^{P} s_k u_k v_k^t \qquad (4)$$

where $s_k$ corresponds to an element in a diagonal matrix S 130; $u_k$ corresponds to an element in a matrix U 120; and $v_k^t$ is an element in a transposed table V 140.

Using this approach, data values stored in table X 110 may be approximated by computing a product of the corresponding data values from table U 120, data values of the diagonal matix S 130, and the transpose of orthogonal matrix V 140.

In an embodiment, SVD approximation is utilized to produce a set of crop yield values in a time space and a location space. The crop yield values are determined from raw crop yield data provided by agricultural agencies. This may be particularly applicable in situations when the raw crop yield data values provided by agricultural agencies is incomplete and/or is missing some yield data for some fields and/or for some time points. The process may include decomposing table X 110 comprising the raw crop yield data values to data values stored in table U 120 and data values stored in table V 140, and then using the data derived for tables 120, 140 and a diagonal matrix 130 to compute or approximate values that have not been provided in the raw crop yield data.

For example, assume that table X 110 stores raw crop data $[x]_{t,l}$ that corresponds to raw crop yield values reported by an agricultural agency as collected during a year t and a location l. Based on inspecting the content of table X 110, it has been determined that table X 110 is missing crop yield data values for some locations and/or for some time points. Determining the values for the missing crop yield readings may be performed by first decomposing the table X 110 into tables U 120 and V 140, and then using the values stored in the tables 120 and 140 to approximate the crop yield values not included in the originally provided raw crop yield dataset.

In an embodiment, once raw crop yield data is decomposed into tables U 120 and V 140, the information stored in tables U 120 and V 140 may be used to compute, or approximate any missing values in table X 110.

Further assume that $u_k$ denotes the left singular vector which corresponds to the inter-year trend and that $v_k^t$ denotes the right singular vector which corresponds to the intra-year spatial component. Additionally, assume that $v_k^t$ remains fixed over time for all k=1 . . . p. Finding particular crop yield values for table X 110 may include determining past yield values as well as future yield values. For example, if raw crop yield data has been provided for locations $L_1 \ldots L_{j-1}, L_{j+1}, \ldots L_k$ as the data was collected at time points $T_1 \ldots T_n$, then the above described approach may allow computing any missing crop yield data that has not been provided for location $L_j$ at any of the times $T_1 \ldots T_n$, as well as predicting any crop yield data that may be collected in the future (beyond a time point $T_n$).

Referring to FIG. 6, if raw crop yield data 150 of crops harvested from location 118 at times 115, 116 and 117 has been provided, then using the decomposition and approximation approach, a missing crop yield data for time 119 at location 118 may be reconstructed from the information stored in the decomposed tables U 120 and V 140.

Similarly, if raw crop yield data has been provided for any location $L_1 \ldots L_k$ as the data was collected at time points $T_1 \ldots, T_{j-1}, T_{j+1}, \ldots T_n$, then SVD may be used to predict any crop yield data harvested at time $T_j$, for any of the locations, as well as predicting any crop yield data that and so forth, as well as to predict any crop yield data may be collected in the future (beyond a time point $T_n$).

It may be difficult to predict any yield data for a particular location if less than two crop yield data items has been reported for that location. Indeed, SVD is not usually designed to decompose an entire column of the input matrix if the input matrix has no values, or just one value, for that column. For example, if less than two crop yield data items is provided, then approximating any crop yield data value for a particular time point may be difficult. Therefore, predicting some future yields for time t+1 for a particular location is possible if at least two or more yield values are available for the particular location.

Therefore, an approximation approach is used for predicting a crop yield value for a particular location at a particular time if at least two or more yield data is available for the particular location for times other than the particular time, or if at least two or more yield data is available for the particular time point from locations other than the particular location. Because of these limitations, the approximation approach allows performing trending of the data representing the crop yield data rather than detrending of the data representing the crop yield data. The approximation allows determining the data values according to the trends captured at least partially by the volatility of the yields. The volatility may depend on a variety of factors, including weather conditions, soil characteristics, and others.

6. Forecasting and Reconstructing Measurements of Yields of Crops

In an embodiment, SVD approach is used to model trends in crop yields. The process of modeling the trends may include forecasting or reconstructing measurements of the crop yield data.

Figure 5:
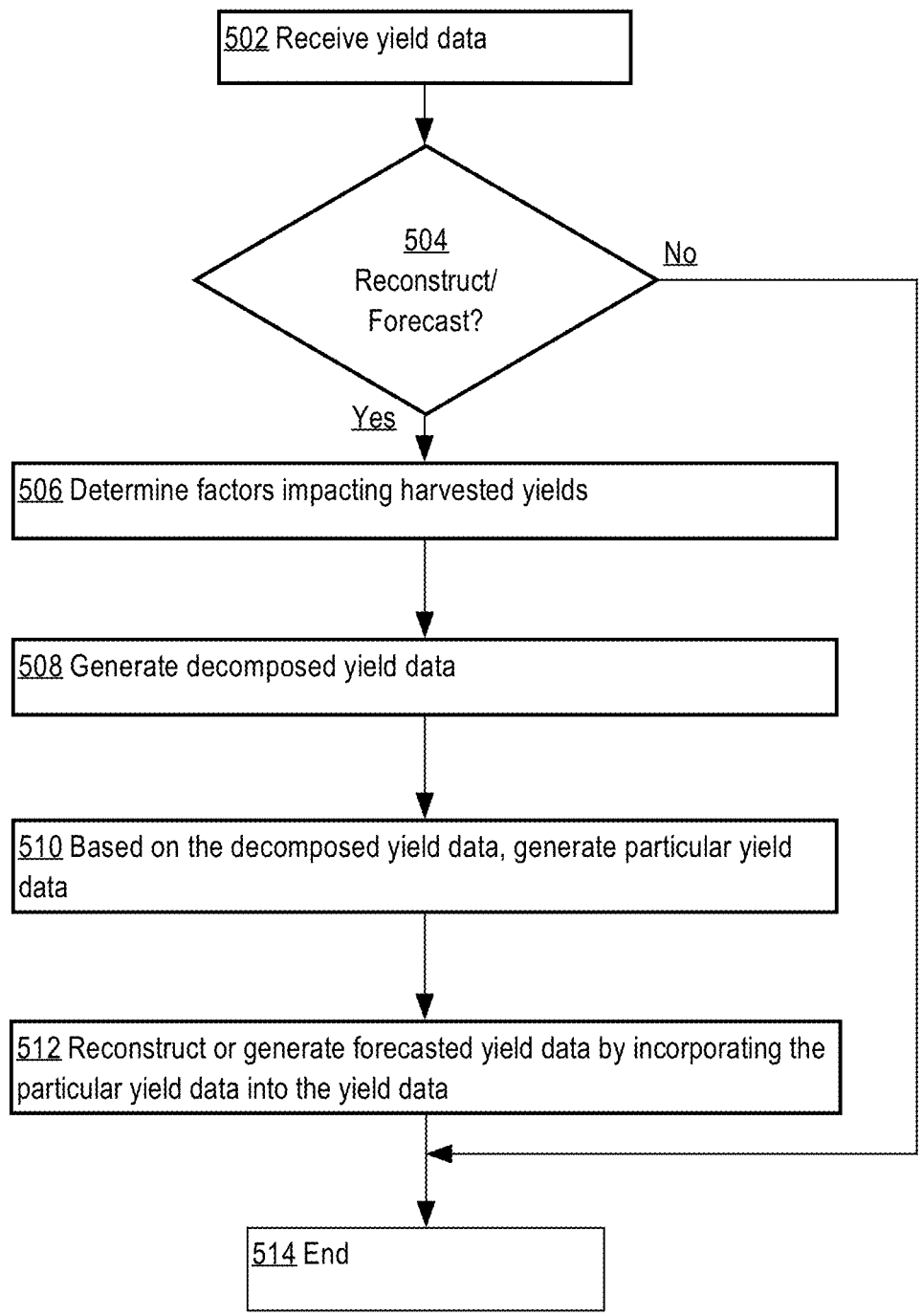
FIG. 5 is a flow diagram that depicts an example method for modeling trends in crop yields.

FIG. 5 is a flow diagram that depicts an example method for modeling trends in crop yields. In step 502, electronic digital yield data is received. The yield data may represent yields of crops that were harvested from a plurality of agricultural fields and at a plurality of time points. The yield data may be received from one or more sources and over one or more computer networks. The yield data may be represented using data structures that allow storing a yield data value for each of the agricultural field from the plurality of agricultural fields and for each time point from the plurality of time points.

In step 504, the process determines whether a request to generate forecasted yield data or to reconstruct yield data is received. In this step, it may be determined, for example, that one or more yield data items are to forecasted or reconstructed.

If it is determined in step 504 that a request to generate forecasted yield data or to reconstruct yield data is received, then step 506 is performed; otherwise, step 514 is performed.

In step 506, one or more factors impacting the yields are determined.

Example factors may include time factors, such as temporal dependencies between agricultural fields from which the crops were harvested. For instance, yields collected during a drought may be expected to be low when collected from most of the fields in a given county, while yields collected when the weather conditions were significantly favorable are expected to be high when collected from most of the fields in a given county. Furthermore, yields collected at the beginning of the harvest may have different characteristics than yields collected at the end of the harvest. Moreover, yields collected during a rainy weather may have different characteristics than yields collected during a sunny weather, and so forth.

Other factors may represent spatial dependencies between agricultural fields from which the crops were harvested. For example, yields collected from two or more neighboring fields of similar sizes may be expected to be similar as the soil and other location-based conditions may be similar in those fields. In contrast, yields collected from two fields that cannot be considered as neighbors of each other may be different for such fields.

Two or more fields may be determined as neighbors using different techniques. For example, neighboring fields may be determined based on their respective geographical locations, including determining for example, whether the fields share common boundaries, or based on certain characteristics of the fields and certain agricultural practices, non-limiting examples of which include soil types, hybrid selections, and the like.

There may be also factors that represent both the temporal dependencies between agricultural fields and the spatial dependencies between the fields. Furthermore, there may also be factors that represent other types of characteristics that in some way impact the yields of the crops that were harvested from the plurality of agricultural fields.

Factor values may be used to decompose a matrix containing the yield measurements into two decomposed matrices as described herein in relation to FIG. 6. Information included in the decomposed matrices may be used to generate or reconstruct one or more missing particular yield data or to modify one or more original yield data items.

In an embodiment, a modified SVD approach that considers both spatial dependencies and temporal dependencies between the harvested crops is used to model crop trends. A particular yield data may be generated using an adjacency matrix that is stored in digital computer memory and that indicates whether a first agricultural field and a second agricultural field from the plurality of agricultural fields share a border, or whether the first and the second fields have some similar characteristics. Furthermore, a spatial covariance data structure, that is determined separately for each year represented in the particular yield data, may also be used to generate the particular yield data.

In an embodiment, one of the factors represents temporal dependencies between crop harvesting from one or more agricultural fields from the plurality of agricultural fields. Furthermore, the particular yield data may be generated using a modified conditional autoregressive approach.

In step 508, decomposed yield data is computed from the measurement data. A process of decomposing a matrix containing the yield data is described in FIG. 6.

In step 510, based on two or more decomposed yield data items, one or more particular yield data items are computed. The one or more particular yield data items may be used as one or more of: future time yield data, present time yield data, or past time yield data. For example, if a request for determining one or more particular future time yield data items was received, then the particular future time yield data item may be generated by incorporating the one or more particular yield data items into the crop yield measurements. According to another example, if a request for determining one or more particular past time yield data items was received, then the particular past time yield data item may be reconstructed by incorporating the one or more particular yield data items into the crop yield measurements.

In step 512, the process reconstructs or generates forecasted yield data by incorporating one or more particular yield data items into the yield data. For example, if in step 504 it was determined that a request for determining one or more particular future time yield data items was received, then in step 512, the process generates forecasted yield data by incorporating the one or more particular yield data items into the yield data. However, if in step 504 it was determined that a request for determining one or more particular past time yield data items was received, then in step 512, the process reconstructs the particular past time yield data item by incorporating the one or more particular yield data items into the yield data.

7. Modified Conditional Auto Regression

CAR usually applies to observation data that exhibits a first order dependency or a relatively local spatial autocorrelation. A relatively local spatial autocorrelation between the observation data may occur, for example, when the data representing crop yields harvested from a particular field is influenced in part by crop yield data collected from immediately adjacent fields, but not by crop yield data collected from non-adjacent fields. The relatively local spatial autocorrelation property of such data allows applying CAR to model auto correlated geo-referenced crop yield data.

In contrast, a data set representing crop yields may not be locally spatially correlated if the crop yields for one agricultural field depend on characteristics of remote fields. For example, crop yield data collected from a particular field at a particular time point is not locally spatially correlated if the crop yield data depends not just on the conditions influencing the crops harvested from the particular field, but also on the conditions influencing the crops harvested from one or more remote fields. Furthermore, crop yield data collected from a particular field at a particular time point may have no spatial correlation at all if the crop yield data is not even dependent on the conditions influencing the crops harvested from the neighboring fields that are local to the particular field.

Under a dynamic system interpretation of CAR model, it is assumed that there is an underlying true yield trend and that a reported yield measurement $y_{i,t}$ is drawn from a distribution characterized by this trend and perturbed by within-year-impulses $\varepsilon_{i,t}$. In particular, it may be assumed that the within-year-impulses $\varepsilon_{i,t}$ have a strong spatial auto correlation. The impulses $\varepsilon_{i,t}$ can be treated as latent features which mask the underlying yield model.

In an embodiment, CAR model is described using a generative process as follows:

$$y_{i,t} = \alpha_i t + \beta_i + \varepsilon_{i,t}$$

$$\alpha_i \stackrel{iid}{\sim} N(\alpha_0, \tau_\alpha)$$

$$\beta_i \stackrel{iid}{\sim} N(\beta_0, \tau_\beta)$$

$$\varepsilon_t \stackrel{iid}{\sim} CAR(\theta_t)$$

$$\theta_t \triangleq (0, \Sigma_t) \qquad (5)$$

where $y_{i,t}$ corresponds to crop yield measurements for the yield harvested from an i-th field and at a t-th time point; "idd" means independently and identically distributed random variables; $\alpha_t$ corresponds to a linear model variable that depends on the time parameter, and is computed based on the national trend N observed for all fields or the region, and based on the weather component $\tau_\alpha$ specific to the all fields or the region; $\beta_t$ corresponds to an offset value for the linear model, and is computed based on the trend N observed for a particular region, and based on the weather component $\tau_\beta$ specific to the particular region; $\varepsilon_{i,t}$ corresponds to an error term that depends on the field-dependent parameter and the time-dependent parameter, and is computed using the CAR approach determined for $\theta_t$; and $\theta_t$ is a mean value.

Imposing CAR structure on the covariance structure of the error terms, $\varepsilon_{i,t}$ may be determined as:

$$\varepsilon_t \stackrel{iid}{\sim} N(0, (I - \rho_c W)^{-1} \tau_t) \qquad (6)$$

where W is a binary adjacency matrix indicating whether or not two counties share a border, and where $$\tau_t = \text{diag}\{\tau_{t,1}^2, \ldots, \tau_{t,n}^2\} \qquad (7)$$

is a diagonal matrix of squared values of weather component $\tau_{t,i}$ specific to the fields, regions, and/or individual counties.

Figure 9:
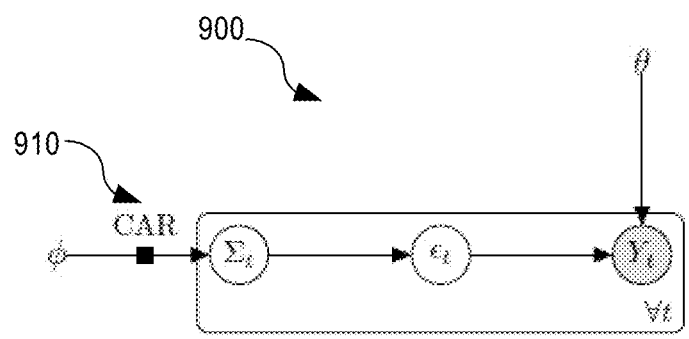
FIG. 9 is a plate diagram of an example conditional autoregressive model.

CAR model described in equation (5) may be represented in a plate diagram. FIG. 9 is a plate diagram of an example CAR model. Plate diagram 900 includes a graphical representation of CAR model 910, and the process of computing error terms $\varepsilon_{i,t}$ and $y_{i,t}$ terms for each time point t.

In an embodiment, the model described in equation (5) differs from a standard CAR model. For example, in the model described in equation (5), the spatial covariance structure is conditioned separately for each year, which may not be the case for a standard CAR model. Furthermore, the parameters of the model described in equation (5) may be modelled differently than it is in a standard CAR model.

The model described in equation (5) may be used to determine trends represented in data capturing yields of crops harvested from agricultural fields.

8. Example of Combined Approaches

Figure 7:
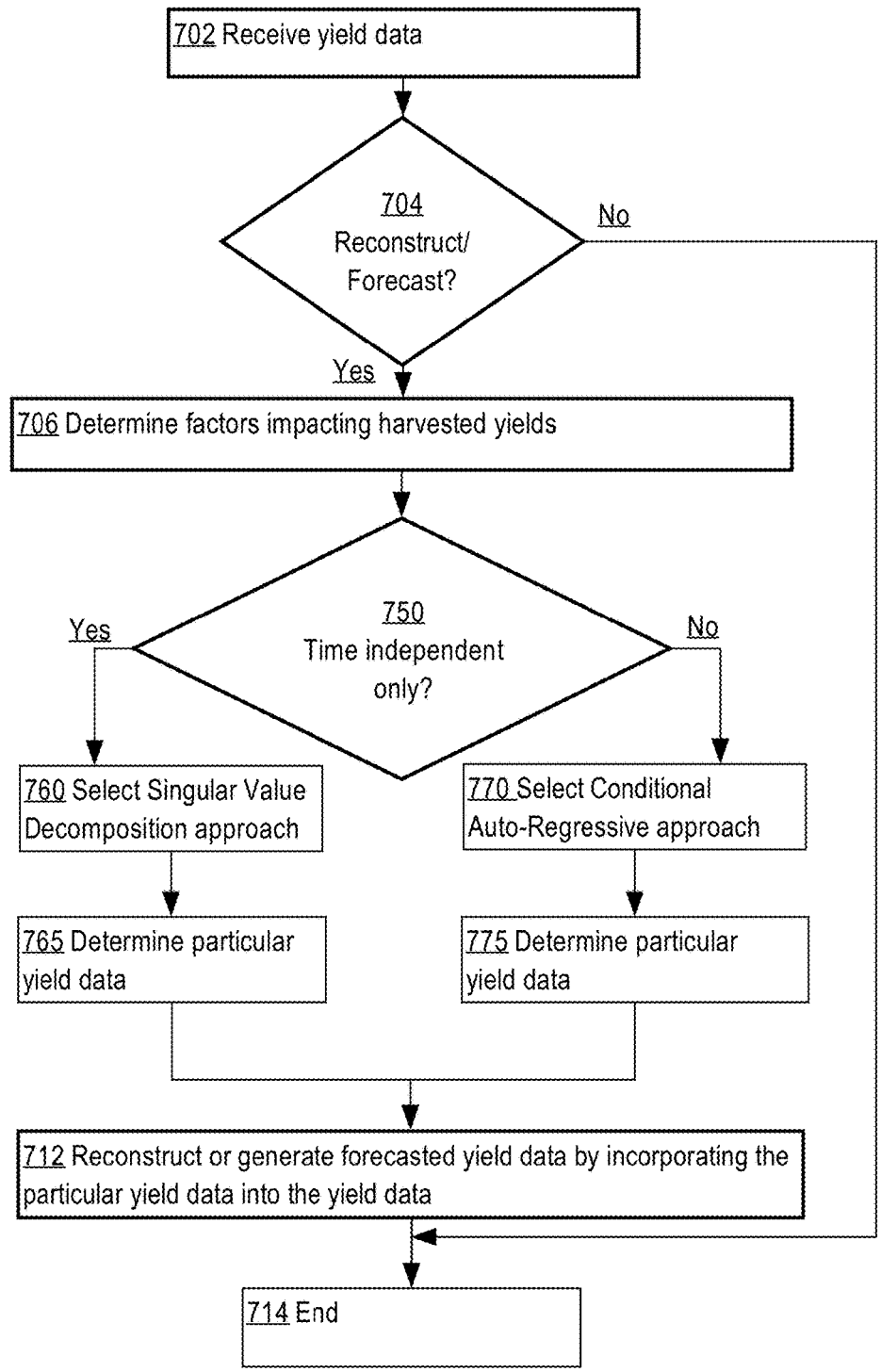
FIG. 7 is a flow diagram that depicts an example method for modeling trends in crop yields.

FIG. 7 is a flow diagram that depicts an example method for modeling trends in crop yields. In step 702, electronic digital data comprising yield data is received. The yield data may represent yields of crops that were harvested from a plurality of agricultural fields and at a plurality of time points. The yield data may be received from various sources and over various computer networks. The yield data may correspond to measurements or observations described above.

In step 704, the process determines whether a request to generate forecasted yield data or to reconstruct yield data is received. In this step, it may be determined that a particular yield data item is missing. It may also be determined, for example, that one or more yield data items are to be forecasted or reconstructed.

If it is determined in step 704 that a request to generate forecasted yield data or to reconstruct yield data is received, then step 706 is performed; otherwise, step 714 is performed.

In step 706, one or more factors impacting the yields harvested from the agricultural fields are determined. The factors may vary and depend on the implementation of the approach. For example, some factors may be time-dependent, and represent temporal dependencies between agricultural fields from which the crops were harvested.

Other factors may represent spatial dependencies between agricultural fields from which the crops were harvested. For example, yields collected from two or more neighboring fields of similar sizes may be expected to be similar as the soil and other location-based conditions may be similar in the those fields.

Yet other factors may represent both the temporal dependencies between agricultural fields and the spatial dependencies between the fields. Additional examples of the factors are described in FIG. 5.

In step 750, it is determined whether the factors impacting the yields harvested from the agricultural fields are time-independent. If all the factors are time-independent, then step 760 is performed. Otherwise, step 770 is performed.

In step 760, a value decomposition approach or algorithm is selected from a group of available value decomposition algorithms. Examples of the value decomposition approaches or algorithms are described for FIG. 5. For example, SVD approach or modified SVD approach may be selected in step 760.

In step 765, the selected decomposition approach is used to decompose a matrix containing the received raw yield data. For example, decomposed yield data may be computed from the measurement data. A process of decomposing a matrix containing the yield data is described in FIG. 6.

Based on one or more decomposed yield data, one or more particular yield data items are computed. The one or more particular yield data items may be used as one or more of: future time yield data, present time yield data, or past time yield data. For example, if a request for determining one or more particular future time yield data items was received, then the particular future time yield data items may be forecasted by incorporating the one or more particular yield data items into the yield data. According to another example, if a request for determining one or more particular past time yield data items was received, then the particular past time yield data items may be reconstructed by incorporating the one or more particular yield data items into the yield data.

In step 712, the process generates forecasted yield data or reconstructs yield data by incorporating one or more particular yield data items into the yield data. For example, if in step 704 it was determined that a request for determining one or more particular future time yield data items was received, then in step 712, the process generates forecasted yield data by incorporating the one or more particular yield data items into the yield data. The one or more particular yield data items may be used to predict the yield of crops harvested in the future. However, if in step 704 it was determined that a request for determining one or more particular past time yield data items was received, then in step 712, the process reconstructs the particular past time yield data items by incorporating the one or more particular yield data items into the yield data.

However, if one or more factors impacting the yields harvested from the agricultural fields are time-dependent, then step 770 is performed.

In step 770, a conditional auto-regressive approach or algorithm is selected from a group of available auto-regressive algorithms. Examples of the auto-regressive algorithms are described in FIG. 9. For example, a CAR approach or a modified CAR approach may be selected in step 770.

In step 780, the selected auto-regression approach is used to determine one or more particular yield data items. The one or more particular yield data may be used as one or more of: future time yield data, present time yield data, or past time yield data. Once the one or more particular yield data items are determined, step 712 is performed. Step 712 is described above.

The approach described in FIG. 7 allows generating forecasted yield data and/or reconstructing a set of raw yield data by taking into consideration one or more factors impacting the yields harvested from the agricultural fields are determined. The approach allows taking into account some factors that are time-dependent, and represent temporal dependencies between agricultural fields from which the crops were harvested, as well as some factors that are time-independent.

9. Example Result Analysis

Figure 8:
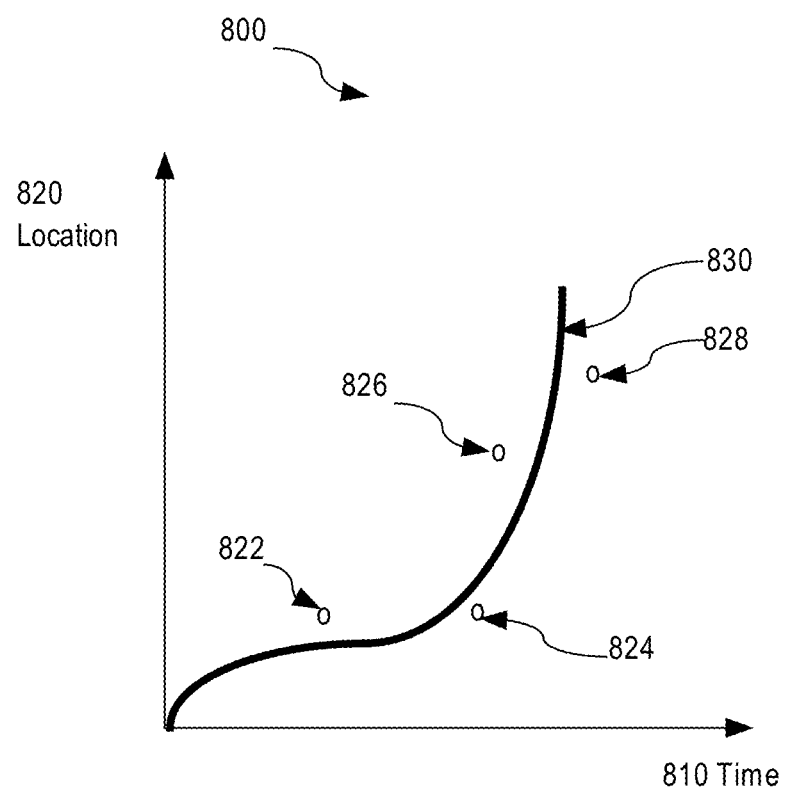
FIG. 8 is a data plot that depicts an example modeling function of crop yields.

FIG. 8 is a data plot that depicts an example modeling function of crop yields. Plot 800 is a two-dimensional graph depicting an example of yields of crops harvested from a plurality of fields (locations) and at a plurality of time points. The plurality of time points is represented along a time horizontal axis 810, while the plurality of locations is represented along a location vertical axis 820.

As depicted in FIG. 8, approximating a trend 830 based on the observation may be difficult as it may be unknown whether the fluctuation in data values was a function of weather, and if so, to what degree. Furthermore, some of the data points may be incorrect as the corresponding measurements may be influenced by specific time-dependent and time-independent factors.

As shown in FIG. 8, data points 822, 824, 826 and 828 were used to determine a trend characteristic 830. Trend characteristic 830 approximates the data points 822, 824, 826 and 828. However, if for example, a data point 822 is incorrect because it was disproportionately influenced by the unexpected weather conditions, then the data point 822 may incorrectly influence the overall trend characteristic 830. Correcting the value of the data point 822 could be used to de-trend the trend characteristic 830.

Applications of models such as SVD model, modified SVD model, CAR model and/or modified SVD models may allow improving the quality of the trend approximation. By modeling the time-dependent factors and the time-independent factors using at least some of the above approaches, the trend approximation may be more accurate and reliable.

In an embodiment, the decomposition and then the approximation of data items representing yields of corps allow removing or modifying the yield data items that appear to be incorrect. The incorrect data are often referred to as noise data, or just noise. The noise data may be removed using the above described approaches, and thus the impact of various factors, such as the weather conditions, may be eliminated to some degree. Using this approach, the trend characteristics may be corrected and the resulting trends may more adequately represent the yield trends.

10. Additional Approaches

In addition to the approaches and algorithms described above, other methods may also be utilized to determine trends for the yields of crops harvested from agricultural fields. Some of the methods are briefly described below.

10.1. Mean Model Approach

In an embodiment, a process for determining trends for the yields of crops harvested from agricultural fields is determined using a mean model algorithm. A mean model approach assumes that the crop yields from each county may be modeled separately using the following equation:

$$y_{i,t} = \beta_i + \epsilon_{i,t}$$

$$\epsilon_{i,t} \overset{\text{iid}}{\sim} N(0, \sigma_i^2) \qquad (8)$$

where $y_{i,t}$ corresponds to crop yield measurements for the yield harvested from an i-th field and at a t-th time point; "idd" means independently and identically distributed random variables; $\beta_i$ corresponds to an offset value for the mean model for an i-th field; where $\epsilon_{i,t}$ corresponds to an error term that depends on a field-dependent parameter and a time-dependent parameter.

A mean model may be used to reconstruct or predict $y_{i,t}$ values by simply determining an average value of the yields harvested from the fields within a county. This may be represented as:

$$\hat{y}_{i,T+1} = \overline{y}_i. \qquad (9)$$

10.2. Linear Model Approach

In an embodiment, a process for determining trends for the yields of crops harvested from agricultural fields is determined using a linear model algorithm. A linear model approach assumes that the crop yields from each county exhibit a linear trend and may be modeled separately using the following equation:

$$y_{i,t} = \alpha_i t + \beta_i + \epsilon_{i,t}$$

$$\epsilon_{i,t} \overset{\text{iid}}{\sim} N(0, \sigma_i^2) \qquad (10)$$

where $y_{i,t}$ corresponds to crop yield measurements for the yield harvested from an i-th field and at a t-th time point; where "idd" means independently and identically distributed random variables; where $\alpha_i$ corresponds to a linear model variable whose value depends on an i-th field; where $\beta_i$ corresponds to an offset value for the linear model for an i-th field; where $\epsilon_{i,t}$ corresponds to an error term that depends on a field-dependent parameter and a time-dependent parameter.

10.3. Robust Linear Model Approach

In an embodiment, a process for determining trends for the yields of crops harvested from agricultural fields is determined using a robust linear model algorithm. This model uses the equation for the linear model presented above, except that the values for the slope and intercept are computed using M-estimators. M-estimators are the estimators that are obtained as the minima of sums of functions of the data. Examples of M-estimators include least-squares estimators, weighted least-squares estimators, and the like.

10.4. Smoothing Splines Approach

In an embodiment, a process for determining trends for the yields of crops harvested from agricultural fields is determined using a smoothing splines algorithm. A smoothing spline model assumes:

$$y_{i,t} = f(x_{i,t}) + \epsilon_{i,t}$$

$$\epsilon_{i,t} \overset{\text{iid}}{\sim} N(0, \sigma^2) \qquad (11)$$

where $y_{i,t}$ corresponds to crop yield measurements for the yield harvested from an i-th field and at a t-th time point; where $f(\bullet)$ is a smoothing function. A penalize regression approach may be used to estimate $f(\bullet)$; where "idd" means independently and identically distributed random variables; where $\epsilon_{i,t}$ corresponds to an error term that depends on a field-dependent parameter and a time-dependent parameter.

A smoothing splines approach allows a user to determine the smoothness of the estimated function. However, usually a more automatic selection method is used to establish the smoothness parameter. For example, a generalized cross validation (GSV) estimate may be used instead.

A smoothing splines approach is usually well suited for interpolating missing data. However, is some situations, the method may exhibit a higher bias at the boundaries. This is because the method assumes a linear behavior when extrapolating the data; this assumption is often incorrect.

10.5. Quadratic Model Approach

In an embodiment, a process for determining trends for the yields of crops harvested from agricultural fields is determined using a quadratic model algorithm. A quadratic model assumes that yields are quadratic in time, and may be represented using the following equation:

$$y_{i,t} = \alpha_i t^2 + \gamma_i t + \beta_i + \epsilon_{i,t} \qquad (12)$$

where $y_{i,t}$ corresponds to crop yield measurements for the yield harvested from an i-th field and at a t-th time point; $\alpha_i$ corresponds to a quadratic model variable whose value depends on an i-th field and is multiplied by a square of the time value; $\gamma$ corresponds to a quadratic model variable whose value depends on an i-th field and is multiplied by the time value; $\beta_i$ corresponds to an offset value for an i-th field; $\epsilon_{i,t}$ corresponds to an error term that depends on a field-dependent parameter and a time-dependent parameter.

10.6. Locally Weighted Regression Approach

In an embodiment, a process for determining trends for the yields of crops harvested from agricultural fields is determined using a locally weighted regression model algorithm. A locally weighted regression model a regression model to a single county using data points from the current county and its surrounding neighbors. The neighborhood for a given county is defined using a distance measure, such as the distance between counties centers. The county that is further away from a center of the current modeled county may have less influence on the output of the model.

10.7. Integrated Moving Average Approach

In an embodiment, a process for determining trends for the yields of crops harvested from agricultural fields is determined using an integrated moving average (IMA) model algorithm. This model assumes that the yield series $y_{i,t}$ is non-stationary. The approach takes into consideration the lagged series that can be corrected. Using this approach, the difference series is modelled as a moving-average.

IMA approach is often a useful model for economic time series. The IMA approach may be used to forecast the current local mean value. For example, the equation $x_{t+1} = x$ $mean_t + \varepsilon_{t+1}$ may be used to perform a one-step forecast is x mean at t, which is the current local mean.

10.8. Random Walk

In an embodiment, a process for determining trends for the yields of crops harvested from agricultural fields is determined using a random walk model algorithm. This model assumes that yields follow a random walk model:

$$y_{i,t} = y_{i,t-1} + \varepsilon_{i,t} \qquad (13)$$

where $y_{i,t}$ corresponds to crop yield measurements for the yield harvested from an i-th field and at a t-th time point; $y_{i,t-1}$ corresponds to crop yield measurements for the yield harvested from an i-th field and a t+1 th time point; $\varepsilon_{i,t}$ corresponds to an error term that depends on a field-dependent parameter and a time-dependent parameter.

The predicted value may be determined as:

$$\hat{y}_{i,T+1} = y_{i,T} \qquad (14)$$

10.9. Multivariate Adaptive Regression Splines Model

In an embodiment, a process for determining trends for the yields of crops harvested from agricultural fields is determined using a multivariate adaptive regression splines (MARS) model algorithm. MARS algorithm is a non-parametric regression technique that can be seen as an extension of linear models that automatically model non-linearities and interactions between variables. MARS is a piecewise linear model that can be represented as:

$$y_{i,t} = \alpha_i [\tau_i - t]_+ + \gamma_i [t - \tau_i]_+ + \beta_i + \varepsilon_{i,t} \qquad (15)$$

where $y_{i,t}$ corresponds to crop yield measurements for the yield harvested from an i-th field and a t-th time point; $[t-\tau_i]_+$ is a linear spline and $\tau_i$ is the knot.

MARS model is used to detect and fit change points in linear trends. The model can be greatly extended to include several change points. However, the MARS suffers from drawbacks similar to those in any smoother method. For extrapolation purposes it assumes a linear trend which may not be valid.

11. Benefits of Certain Embodiments

The techniques described herein offer a coherent and robust approach for modeling trends in yields of crops harvested from agricultural fields. For example, using a presented decomposition approach and then an approximation approach, future yields can be predicted.

Presented decomposition approach improves the efficiency of computer resources used to model trends in crop yields. By decomposing large sets of collected measurements data into relatively small subsets and then processing the data from the small subsets, not the large sets, smaller amounts of computer resources such as CPU, computer memory and network bandwidth are used. The efficient way of processing the collected measurements and using the resulting models allow an efficient use of computer equipment installed in harvester combines. For example, data from the resulting models may be used to correct information collected in the field, and the resulting data may be used to control and enhance the way agricultural fields are cultivated. The corrected information may be used to drive or control agricultural equipment or computer systems controlling the equipment. Data included in the resulting models may be used to develop recommendations for the agricultural systems and planting and fertilizing equipment. Furthermore, the data included in the resulting models may be displayed on display devices of computer systems used to control the crop planting, fertilizing and harvesting.

Using the presented approaches, yield data that have not been provided for the harvested yields may be approximated or otherwise determined. The presented approach also allows correcting errors in the yields data provided by various agencies and from various sources.

In addition, the data decomposition and approximation techniques described herein allow interpreting various dynamics and dependencies of the yields harvested from collocated agricultural fields.

Furthermore, applying the presented approach to raw crop yield measurements, to approximate spatial and temporal dependencies of crop yields harvested from agricultural fields, allows analyzing the crop yield data in the context of independencies between various characteristics specific to not just individual fields or locations, but also groups of fields and regions. For example, it allows determining spatial relationships between the measurements data collected from neighboring fields. The spatial relationships may include the impact the weather conditions may have on the neighboring fields, the irrigation conditions impacting the crop yields collected from the irrigated fields, and the like.

What is claimed is:

1. A method comprising:

using data receiving instructions programmed in a computer system comprising one or more processors and computer memory, sending one or more requests to one or more remote sensors installed on agricultural equipment to provide, over a computer network, electronic digital data comprising yield data representing yields of crops that were harvested from a plurality of agricultural fields and at a plurality of time points;

using the data receiving instructions in the computer system, receiving over the computer network, in response to sending the one or more requests to the one or more remote sensors installed on the agricultural equipment, the electronic digital data comprising yield data from the one or more remote sensors;

using data analyzing instructions in the computer system, in response to receiving input specifying a request to generate particular yield data:

using yield dependency instructions in the computer system, determining one or more factors that impact yields of crops that were harvested from the plurality of agricultural fields;

wherein at least one factor of the one or more factors that impacts yields of crops that were harvested from the plurality of agricultural fields is time independent and represents spatial dependencies between two or more agricultural fields from the plurality of agricultural fields;

using data decomposition instructions in the computer system, decomposing the yield data into decomposed yield data that identifies one or more data dependencies according to the one or more factors;

using data approximation instructions in the computer system, generating, based on the decomposed yield data, the particular yield data using a modified singular value decomposition that uses the at least one factor that was determined for one or more items in the yield data;

wherein the particular yield data includes fewer values than the yield data;

using data reconstruction instructions in the computer system, generating forecasted yield data by processing and incorporating the particular yield data into the yield data;

wherein the generating forecasted yield data by processing and incorporating the particular yield data, which includes fewer values than the yield data, uses less computational and storage resources than determining forecasted yield using the yield data;

displaying the forecasted yield data on a display of the computer system to control crop planting, fertilizing and harvesting.

2. The method of claim 1, where at least one factor of the one or more factors that impacts the yields of crops that were harvested from the plurality of agricultural fields is time dependent and represents temporal dependencies between crop harvesting from one or more agricultural fields from the plurality of agricultural fields; further comprising generating the particular yield data using a modified conditional autoregression using the at least one factor determined for one or more items in the yield data.

3. The method of claim 2, further comprising generating the particular yield data using an adjacency matrix that is stored in digital computer memory and that indicates whether a first agricultural field and a second agricultural field from the plurality of agricultural fields share a border, and using a spatial covariance data structure that is determined separately for each year represented in the particular yield data.

4. The method of claim 2, further comprising generating the particular yield data using regional yield trend data that is specific to one or more fields of the plurality of agricultural fields and national yield trend data.

5. The method of claim 2, further comprising generating the particular yield data using one or more weather variability components and one or more weather patterns that are specific to the plurality of agricultural fields.

6. The method of claim 1, further comprising using the decomposed yield data to interpret spatial and temporal dependencies between yields of crops that were harvested from the plurality of agricultural fields and to determine how weather conditions and region adjacencies influence yields.

7. The method of claim 1, where the particular yield data is generated to obtain one or more of: future time yield data, present time yield data, or past time yield data.

8. The method of claim 1, where a particular yield data of the particular yield data for a particular time point and a particular agricultural field is used to verify an accuracy of the yield data received for the particular time point and the particular agricultural field.

9. The method of claim 1, further comprising generating a yield data model by implementing one or more of: a mean model, a linear model, a robust linear model, a smooth spline, a quadratic model, a locally weighted regression model, an integrated moving average model, a random walk model, a multivariate adaptive regression splines model, an SVD standard model, or a CAR standard model.

10. A data processing system comprising:
a memory;
one or more processors coupled to the memory and programmed to:
send one or more requests to one or more remote sensors installed on agricultural equipment to provide, over a computer network, electronic digital data comprising yield data representing crop yields harvested from a plurality of agricultural fields and at a plurality of time points;

in response to sending the one or more requests to the one or more remote sensors installed on the agricultural equipment, receive over the computer network the electronic digital data comprising yield data;

in response to receiving input specifying a request to generate particular yield data:

determine one or more factors that impact yields of crops that were harvested from the plurality of agricultural fields;

wherein at least one factor of the one or more factors that impacts yields of crops that were harvested from the plurality of agricultural fields is time independent and represents spatial dependencies between two or more agricultural fields from the plurality of agricultural fields;

decompose the yield data into decomposed yield data that identifies one or more data dependencies according to the one or more factors;

wherein the particular yield data includes fewer values than the yield data;

generate, based on the decomposed yield data, the particular yield data using a modified singular value decomposition that uses the at least one factor that was determined for one or more items in the yield data;

generate forecasted yield data by processing and incorporating the particular yield data into the yield data;

wherein the generating forecasted yield data by processing and incorporating the particular yield data, which includes fewer values than the yield data, uses less computational and storage resources than determining forecasted yield of the yield data;

displaying the forecasted yield data on a display of a computer system to control crop planting, fertilizing and harvesting.

11. The data processing system of claim 10, where at least one factor of the one or more factors that impacts the yields of crops that were harvested from the plurality of agricultural fields is time dependent and represents temporal dependencies between crop harvesting from one or more agricultural fields from the plurality of agricultural fields; wherein the method further comprises generating the particular yield data using a modified conditional autoregression using the at least one factor determined for one or more items in the yield data.

12. The data processing system of claim 11, where the one or more processors coupled to the memory are further programmed to generate the particular yield data using an adjacency matrix that is stored in digital computer memory and that indicates whether a first agricultural field and a second agricultural field from the plurality of agricultural fields share a border, and using a spatial covariance data structure that is determined separately for each year represented in the particular yield data.

13. The data processing system of claim 11, where the one or more processors coupled to the memory are further programmed to generate the particular yield data using regional yield trend data that is specific to one or more fields of the plurality of agricultural fields and national yield trend data.

14. The data processing system of claim 11, where the one or more processors coupled to the memory are further programmed to generate the particular yield data using one or more weather variability components and one or more weather patterns that are specific to the plurality of agricultural fields.

15. The data processing system of claim 10, where the one or more processors coupled to the memory are further programmed to use the decomposed yield data to interpret spatial and temporal dependencies between yields of crops that were harvested from the plurality of agricultural fields and to determine how weather conditions and region adjacencies influence yields.

16. The data processing system of claim 10, where the particular yield data is generated to obtain one or more of: future time yield data, present time yield data, or past time yield data.

17. The data processing system of claim 10, where the particular yield data for a particular time point and a particular agricultural field is used to verify an accuracy of the yield data received for the particular time point and the particular agricultural field.

18. The data processing system of claim 10, where the one or more processors coupled to the memory are further programmed to generate a yield data model by implementing one or more of: a mean model, a linear model, a robust linear model, a smooth spline, a quadratic model, a locally weighted regression model, an integrated moving average model, a random walk model, a multivariate adaptive regression splines model, an SVD standard model, or a CAR standard model.

* * * * *